United States Patent
Arora et al.

(10) Patent No.: US 11,373,202 B2
(45) Date of Patent: Jun. 28, 2022

(54) METHOD AND SYSTEM FOR REFERRAL FRAUD PREVENTION VIA BLOCKCHAIN

(71) Applicant: MASTERCARD INTERNATIONAL INCORPORATED, Purchase, NY (US)

(72) Inventors: Ankur Arora, New Delhi (IN); Rakesh Patel, Haryana (IN); Ankur Dua, Haryana (IN); Aditya Koduri, Haryana (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 190 days.

(21) Appl. No.: 16/035,792

(22) Filed: Jul. 16, 2018

(65) Prior Publication Data
US 2020/0019980 A1    Jan. 16, 2020

(51) Int. Cl.
*G06Q 30/02* (2012.01)
*G06Q 20/40* (2012.01)
(Continued)

(52) U.S. Cl.
CPC ..... *G06Q 30/0214* (2013.01); *G06Q 20/3674* (2013.01); *G06Q 20/4016* (2013.01); *G06Q 30/06* (2013.01); *H04L 9/0637* (2013.01); *H04L 9/3247* (2013.01); *H04L 67/306* (2013.01); *H04L 2209/38* (2013.01)

(58) Field of Classification Search
None
See application file for complete search history.

(56) References Cited

U.S. PATENT DOCUMENTS

| 10,354,325 | B1 * | 7/2019 | Skala | G06Q 40/04 |
| 10,438,290 | B1 * | 10/2019 | Winklevoss | G06Q 20/223 |

(Continued)

FOREIGN PATENT DOCUMENTS

| JP | 2004-519874 A | * | 7/2004 | G06F 12/14 |
| WO | WO 2017/182601 | * | 4/2017 | G06Q 20/36 |

(Continued)

OTHER PUBLICATIONS

What is a Blockchain Wallet, Investopedia.*

*Primary Examiner* — David J Stoltenberg
(74) *Attorney, Agent, or Firm* — Buchanan Ingersoll & Rooney PC

(57) ABSTRACT

A method for preventing account referral fraud includes: receiving a referral request, the request including a referring account identifier; transmitting a digital signature corresponding to the referral request to a processing server; verifying, by the processing server, the digital signature using a public key; identifying a plurality of blockchain data values included in a blockchain using the public key, wherein each data value is related to a blockchain transaction involving a blockchain wallet associated with the public key; generating an authenticity score for the blockchain wallet based on data included in the plurality of blockchain data values; receiving, by the referral server, the authenticity score from the processing server; and processing the referral request based on the authenticity score, wherein processing the referral request includes one of: declining the referral and awarding a referral reward.

16 Claims, 5 Drawing Sheets

(51) Int. Cl.
  *G06Q 20/36* (2012.01)
  *H04L 67/306* (2022.01)
  *H04L 9/32* (2006.01)
  *H04L 9/06* (2006.01)
  *G06Q 30/06* (2012.01)

(56) References Cited

U.S. PATENT DOCUMENTS

| | | | | |
|---|---|---|---|---|
| 10,546,296 | B2* | 1/2020 | Narasimhan | G06Q 20/3829 |
| 10,567,156 | B2* | 2/2020 | Castinado | H04L 67/104 |
| 2005/0160095 | A1* | 7/2005 | Dick | H04L 69/329 |
| 2009/0158029 | A1* | 6/2009 | Wheeler | G07F 7/1008 713/155 |
| 2016/0078463 | A1* | 3/2016 | Wilson | G06Q 30/0635 705/14.16 |
| 2016/0098723 | A1* | 4/2016 | Feeney | G06Q 20/065 705/75 |
| 2016/0342994 | A1* | 11/2016 | Davis | G06Q 20/4014 |
| 2017/0046638 | A1* | 2/2017 | Chan | G06Q 40/08 |
| 2017/0132625 | A1* | 5/2017 | Kennedy | G06F 16/2379 |
| 2017/0132626 | A1* | 5/2017 | Kennedy | G06Q 20/401 |
| 2017/0236140 | A1* | 8/2017 | Feduk, Jr. | G06Q 30/0239 705/14.16 |
| 2017/0317834 | A1* | 11/2017 | Smith | G06Q 20/065 |
| 2017/0317997 | A1* | 11/2017 | Smith | H04L 9/3271 |
| 2018/0018723 | A1* | 1/2018 | Nagla | G06Q 30/0609 |
| 2018/0075527 | A1* | 3/2018 | Nagla | G06F 21/6218 |
| 2018/0109507 | A1* | 4/2018 | Caldera | G06N 20/00 |
| 2018/0189789 | A1* | 7/2018 | Caldera | G06N 7/005 |
| 2018/0204191 | A1* | 7/2018 | Wilson | H04L 9/3242 |
| 2018/0216946 | A1* | 8/2018 | Gueye | G06F 3/04817 |
| 2018/0240191 | A1* | 8/2018 | Aronson | G06Q 40/06 |
| 2018/0276698 | A1* | 9/2018 | Bryant, III | G06Q 50/01 |
| 2018/0293603 | A1* | 10/2018 | Glazier | G06Q 30/0239 |
| 2018/0316507 | A1* | 11/2018 | Smith | H04L 9/0637 |
| 2018/0316665 | A1* | 11/2018 | Caldera | H04L 63/08 |
| 2018/0341945 | A1* | 11/2018 | Welborn | G06Q 30/0226 |
| 2019/0034920 | A1* | 1/2019 | Nolan | H04L 9/0822 |
| 2019/0096021 | A1* | 3/2019 | Jarvis | G06F 21/34 |
| 2019/0109717 | A1* | 4/2019 | Reddy | H04L 9/0643 |
| 2019/0172067 | A1* | 6/2019 | Arora | G06Q 20/223 |
| 2019/0180276 | A1* | 6/2019 | Lee | H04L 63/10 |
| 2019/0188806 | A1* | 6/2019 | Torrenegra | G06Q 50/01 |
| 2019/0213652 | A1* | 7/2019 | Sharma | G06Q 30/0609 |
| 2019/0251234 | A1* | 8/2019 | Liu | G06F 21/31 |
| 2019/0251552 | A1* | 8/2019 | Kurian | H04L 63/0861 |
| 2019/0261169 | A1* | 8/2019 | Kamal | H04W 12/02 |
| 2019/0279215 | A1* | 9/2019 | Kuchar | H04L 9/0618 |
| 2019/0280861 | A1* | 9/2019 | Smith | G06Q 20/065 |
| 2019/0303552 | A1* | 10/2019 | Houseworth | G06F 21/32 |
| 2019/0303807 | A1* | 10/2019 | Gueye | G06Q 10/02 |
| 2019/0303939 | A1* | 10/2019 | Kurian | G06Q 20/3224 |
| 2019/0303942 | A1* | 10/2019 | Balaraman | G06Q 20/4016 |
| 2019/0312869 | A1* | 10/2019 | Han | G06F 16/9024 |
| 2019/0318359 | A1* | 10/2019 | Arora | G06Q 20/401 |
| 2019/0319808 | A1* | 10/2019 | Fallah | H04L 9/30 |
| 2019/0325532 | A1* | 10/2019 | Torrenegra | G06Q 10/1053 |
| 2019/0333097 | A1* | 10/2019 | Sohum | H04L 63/101 |
| 2019/0342336 | A1* | 11/2019 | Finkelstein | H04L 9/3239 |
| 2019/0349426 | A1* | 11/2019 | Smith | H04L 67/104 |
| 2019/0354723 | A1* | 11/2019 | Dassenno | H04L 63/126 |
| 2019/0361917 | A1* | 11/2019 | Tran | G06Q 40/04 |
| 2019/0370788 | A1* | 12/2019 | Aronson | G06F 8/24 |
| 2019/0370813 | A1* | 12/2019 | Bravick | G06Q 20/4016 |
| 2019/0378152 | A1* | 12/2019 | Zhang | G06Q 20/06 |
| 2019/0392406 | A1* | 12/2019 | Deshpande | G06F 21/64 |
| 2020/0019980 | A1* | 1/2020 | Arora | H04L 9/3239 |
| 2020/0020037 | A1* | 1/2020 | Idrobo | G06Q 10/10 |
| 2020/0027089 | A1* | 1/2020 | Kuchar | H04L 63/00 |
| 2020/0082401 | A1* | 3/2020 | Arora | H04L 9/3239 |
| 2020/0134656 | A1* | 4/2020 | Padmanabhan | H04L 9/0637 |
| 2021/0176251 | A1* | 6/2021 | Ozhigin | H04L 63/10 |

FOREIGN PATENT DOCUMENTS

| | | | | |
|---|---|---|---|---|
| WO | WO 2017/182601 | A1 * | 4/2017 | G06Q 20/36 |
| WO | WO 2019/204670 | A2 * | 10/2019 | H04L 63/061 |
| WO | WO 2020/149790 | A1 * | 12/2019 | H04L 9/32 |

* cited by examiner

METHOD AND SYSTEM FOR REFERRAL FRAUD PREVENTION VIA BLOCKCHAIN

FIELD

The present disclosure relates to the prevention of referral fraud via the use of blockchain, specifically the generation of authenticity scores for blockchain accounts for use in determining if a referred user is genuine to prevent fraud.

BACKGROUND

Marketing can be important for many businesses and other entities that rely on expanding their user base. One of the more successful types of marketing is having existing users refer others that they know. Referrals are often given considerably more weight by potential users, who are more likely to trust the word of a friend or family member over an advertisement. In addition, referrals are often significantly less expensive to implement than other marketing methods, thus resulting in a greater success rate for a lesser cost. In order to motivate existing users to make a referral, an entity will often offer a reward of some type to the referring user.

However, the offering of a reward can sometimes backfire on the entity. A reward offer can often entice a fraudster to look for ways to game the referral system, such as by referring fake accounts made by the fraudster or referring real accounts that are controlled by the fraudster with no intention of using the entity on the additional accounts. In such cases, the entity may have a number of new accounts registered therewith that referral rewards are paid for, but where the new accounts never materialize into new, genuine users.

One method of combating such issues is to provide a higher barrier of entry for a new user or a more difficult criteria to fulfill before a referral reward is paid. For example, a referred user may be forced to perform a number of actions or spend a predetermined amount of money before a referral reward is given to the referring user. However, the more difficult the criteria is that must be fulfilled, the less likely a new user may be to perform the necessary actions or, in some cases, even register with the entity. In addition, the criteria and reward may be such that it is worth it for the fraudster to fulfill the criteria themselves, which would do little in the way of ensuring that each new account is a genuine new user.

Thus, there is a need for a technical solution that provides stronger defense against referral fraud, specifically with respect to determining if the referred user is a genuine person and not a fake account.

SUMMARY

The present disclosure provides a description of systems and methods for preventing account referral fraud. Any referral for an entity must be accompanied by a digital signature generated by a private key of the referred account that corresponds to a blockchain wallet. The digital signature can be validated, and all blockchain transactions conducted using that wallet identified. An authenticity score is determined based on the transaction history of the blockchain wallet, which evaluates aspects of past blockchain transactions to determine how authentic of a user (e.g., not a fake user or fake account) the referred user is. This authenticity score is provided to the entity, which can then decide to honor the referral or not based on the score, or to have the referral reward reflect the authenticity score. The result is a technological system that can reduce referral fraud by determining authenticity of a referred user.

A method for preventing account referral fraud includes: receiving, by a receiving device of a referral server, a referral request, wherein the referral request includes at least a referring account identifier; transmitting, by a transmitting device of the referral server, at least a digital signature corresponding to the referral request to a processing server; verifying, by a processing device of the processing server, the digital signature using a public key; identifying, by the processing device of the processing server, a plurality of blockchain data values included in one or more blocks of a blockchain using the public key, wherein each blockchain data value is related to a blockchain transaction involving a blockchain wallet associated with the public key; generating, by the processing device of the processing server, an authenticity score for the blockchain wallet based on data included in one or more of the identified plurality of blockchain data values; receiving, by the receiving device of the referral server, the generated authenticity score from the processing server; and processing, by a processing device of the referral server, the received referral request based on the authenticity score, wherein processing the referral request includes one of: declining the referral and awarding a referral reward.

A system for preventing account referral fraud includes: a receiving device of a referral server configured to receive a referral request, wherein the referral request includes at least a referring account identifier; a transmitting device of the referral server configured to transmit at least a digital signature corresponding to the referral request to a processing server; and a processing device of the processing server configured to verify the digital signature using a public key, identify a plurality of blockchain data values included in one or more blocks of a blockchain using the public key, wherein each blockchain data value is related to a blockchain transaction involving a blockchain wallet associated with the public key, and generate an authenticity score for the blockchain wallet based on data included in one or more of the identified plurality of blockchain data values, wherein the receiving device of the referral server is further configured to receive the generated authenticity score from the processing server, and a processing device of the referral server is configured to process the received referral request based on the authenticity score, wherein processing the referral request includes one of: declining the referral and awarding a referral reward.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Prevention of Account Referral Fraud

Figure 1:
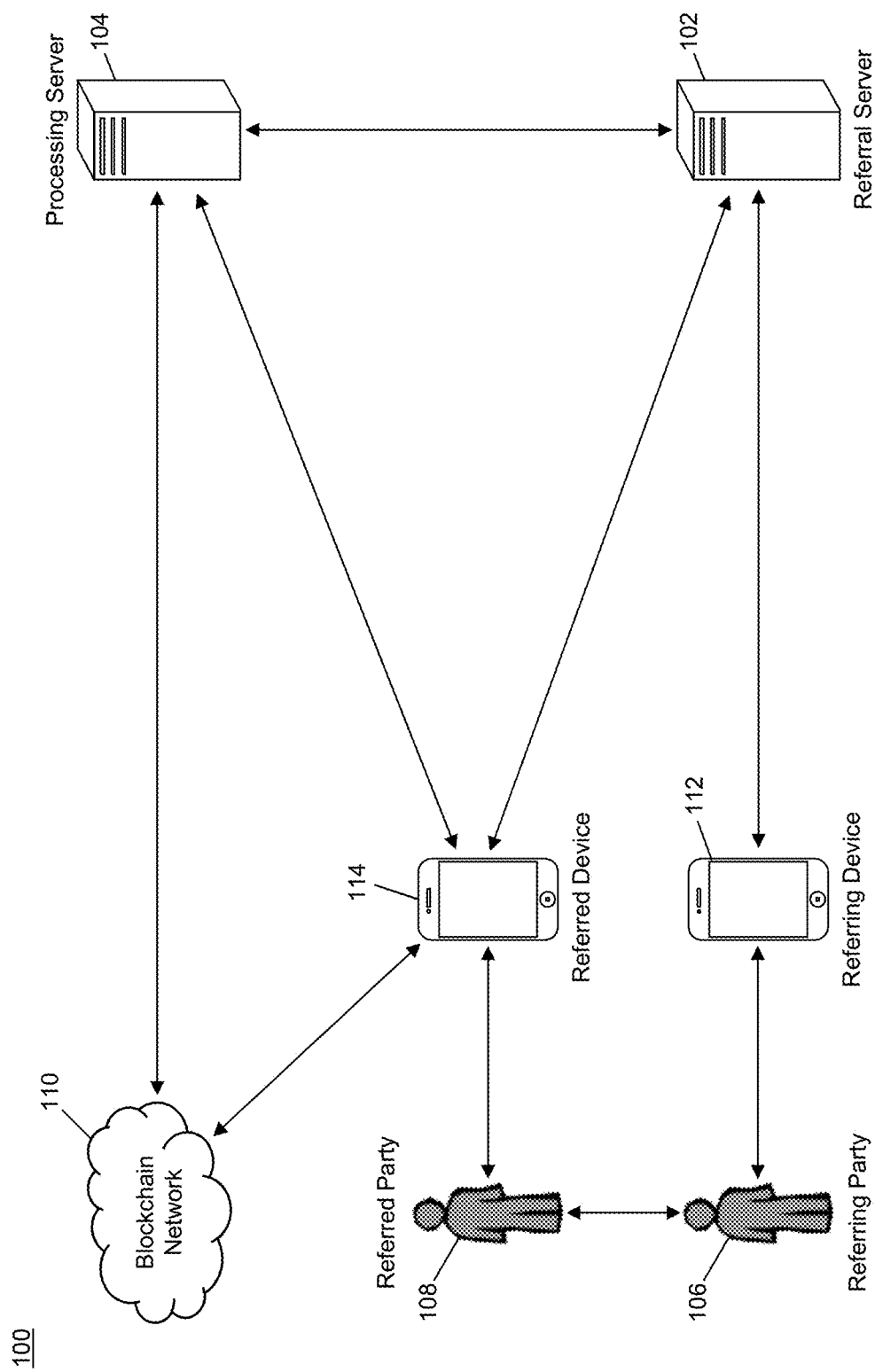
FIG. 1 is a block diagram illustrating a high level system architecture for preventing account referral fraud in accordance with exemplary embodiments.

FIG. 1 illustrates a system 100 for the prevention of referral fraud in account referrals using an authenticity score determined based on a transaction history of a referred user on a blockchain.

The system 100 may include a referral server 102. The referral server 102, discussed in more detail below with respect to the computing system 200 illustrated in FIG. 2, may be configured to provide one or more products to users thereof and, as part of the providing of products, may encourage existing users to refer other users. As part of the encouraging of referrals, the referral server 102 may be configured to provide a referral reward for a successful referral. In the system 100, a processing server 104, discussed in more detail below with respect to the computing system 200 illustrated in FIG. 2, may be configured to determine an authenticity score as a measure of the authenticity of a potential user as being a genuine user, which may be used by the referral server 102 in determining if a referral reward should be awarded for the referral.

In the system 100, a referring party 106 may be a user of the referral server 102. For instance, the referring party 106 may be an individual that uses a social network provided by the referral server 102, or the referring party 106 may be a customer that shops at a store associated with the referral server 102. The referring party 106 may wish to refer another user to the referral server 102, referred to herein as referred party 108. The referred party 108 may by a user that is not previously registered with the referral server 102 whom the referring party 106 wants to refer. Both the referring party 106 and the referred party 108 may have a computing device associated therewith that is used to interact with the referral server 102, illustrated in FIG. 1 as referring device 112 and referred device 114, respectively. Each of the devices may be any type of computing device suitable for performing the functions discussed herein, such as a cellular phone, smart phone, smart watch, smart television, wearable computing device, implantable computing device, desktop computer, laptop computer, notebook computer, tablet computer, etc.

In the system 100, the referred party 108 may conduct one or more electronic transactions using a blockchain. The blockchain may be managed and operated by a plurality of nodes comprising a blockchain network 110. Each of the nodes in the blockchain network 110 may be configured to maintain a copy of the blockchain, generate new blockchain data values, generate new blocks, and validate and confirm new blocks generated by other nodes in the blockchain network 110. In some instances, nodes in the blockchain network 110 may be different types of computing devices as long as each are configured to perform the functions of a node. For example, both the referring device 112 and referred device 114 may be a node, but may also be configured to perform the functions discussed herein.

The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header, also referred to herein as blockchain data values. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 110 prior to the generation and addition of a new block to the blockchain in order for the change to be made permanent. Computational and communication limitations may make such a modification exceedingly difficult, if not impossible, thus rendering the blockchain immutable.

Each blockchain data value may be related to a transaction conducted using the blockchain. Transactions may be transactions related to the transfer of currency, such as payments made between two entities using a blockchain currency or records of electronic payments of a fiat currency, or any other type of transaction that may be conducted and/or recorded on a blockchain. For instance, each transaction on the blockchain may be a related to a contract, such as transactions for the offering of a contract, for the acceptance of a contract, the ratification of a contract, the performance of actions specified in a contract, etc. Each blockchain data value may include at least an address or other value that may be generated by or otherwise associated with a public key. A public key may be one half of a cryptographic key pair comprised of a public key and a private key. As discussed herein, the private key of a cryptographic key pair, or in some cases the full cryptographic key pair, may be referred to as a "blockchain wallet," where the private key is used to generate digital signatures that are used for authentication of a user in the submission of a new transaction to the blockchain network 110.

In the system 100, the referred device 114 may have a blockchain wallet stored therein, which may consist of at least the private key of a cryptographic key pair associated with the referred party 108. When the referred party 108 conducts blockchain transactions, the referred device 114 may generate a digital signature using the private key, which may be used to authenticate the referred device 114 (e.g., and by extension, the referred party 108) prior to a new transaction being included in a block and added to the blockchain. For example, if the blockchain is used for transfer of blockchain currency, the digital signature may be used to authenticate the referred device 114 as being the blockchain wallet with access to specific funds stored in the blockchain for transfer to another wallet (e.g., identified using its own public key).

When the referred party 108 is referred to the referral server 102, a digital signature generated by the private key on the referred device 114 may be provided to the referral server 102. The digital signature may be provided directly by the referred device 114, or may be transmitted to the referring device 112, which may forward the digital signature on when providing the referral of the referred party 108. For example, the referring device 112 may provide an address of the referred device 114 (e.g., an e-mail address, phone number, internet protocol address, device identifier, etc.) to the referral server 102 as part of the referral, where the referral server 102 may contact the referred device 114 and request the digital signature. In some embodiments, the public key of the referred device's cryptographic key pair may also be provided to the referral server 102.

The referral server 102 may receive the digital signature for the referred party 108 and may electronically transmit the digital signature to the processing server 104 in a request for an authentication score. The processing server 104 may receive the request for authentication score from the referral server 102 with the digital signature. In some cases, the referral server 102 may provide the contact address for the referred device 114 in place of the digital signature. In such cases, the processing server 102 may then request the digital signature from the referred device 114 using the contact address. In embodiments where the referred device 114 provided its public key to the referral server 102, or if the referral server 102 was already in possession of the public key, the authentication score request may include the public key. In other embodiments, the processing server 102 may already be in possession of the public key (e.g., the processing server 102 may receive public keys for all new blockchain wallets that utilize the blockchain network 110) or may obtain the public key after receiving the authentication score request, such as by requesting it from the blockchain network 110 or directly from the referred device 114.

Once the request for an authentication score is received, the processing server 104 may verify the digital signature. Verification of the digital signature may be performed using the public key of the cryptographic key pair of the referred device 114 using a suitable signature generation algorithm. Verification of the digital signature may serve to verify that the referred device 114 operates as a specific blockchain wallet, corresponding to the private key used to generate the digital signature or that the referred party 108 is an otherwise authorized user of that blockchain wallet. If the verification is unsuccessful, the processing server 104 may notify the referral server 102 accordingly, which may then deny the referral out of concern for fraud. In some cases, the referring party 106 and/or referred party 108 may be provided with an opportunity to provide a new digital signature.

Upon successful verification of the digital signature, the processing server 104 may identify blockchain transactions conducted using the blockchain wallet of the referred device 114. The transactions may be identified using the public key associated with the referred device 114. For instance, if the blockchain data values are for transfers of blockchain currency, each data value that includes an address generated by the public key may be identified where the referred party 108 (e.g., by use of the referred device's blockchain wallet) was a buyer or seller in the respective transaction. Once the processing server 102 has identified all blockchain data values associated with the referred device 114, the processing server 102 may generate an authenticity score for the blockchain wallet.

The authenticity score may be a measure that determines the authenticity of the blockchain wallet, and by extension the referred party 108, as a genuine user (e.g., not the referring party 106 pretending to be a second user or a fake account). The authenticity score may be based on the data included in each of the identified blockchain data values, where specific criteria may vary based on the type of blockchain transactions involved. The authenticity score may be based on at least, for instance, the overall number of blockchain transactions, frequency of blockchain transactions, and time between the first and last blockchain transactions. The authenticity score may also use additional data as available. For example, if the blockchain transactions are for the transfer of blockchain currency, the authenticity score may be further based on the number of different wallets involved in transactions involving the referred device 114 (e.g., where if all transfers are to/from the same wallet, such as corresponding to the referring device 112, the authenticity score may be significantly low as fraud may be indicated), the overall amount of currency transferred, average transfer amount, etc. In some cases, the referral server 102 may specify criteria to be used in determining the authenticity score, such as may be included in the submitted request.

Once the authenticity score is determined, the processing server 104 may provide the authenticity score to the referral server 102 in a response to the submitted request. The referral server 102 may receive the authenticity score and determine whether or not to honor the referral accordingly.

For instance, the referral server 102 may have a predetermined threshold value, where authenticity scores above (e.g., or below, as applicable) the threshold may have the referral honored while authenticity scores below the threshold may have the referral reward denied. Honoring of the referral may include the awarding of the referral award to the referring party 106, such as by crediting an account of the referring party 106 with additional funds, providing of a good or service to the referring party 106, or other reward as will be apparent to persons having skill in the relevant art. In some cases, the referral server 102 may provide a notification to the referring party 106 (e.g., via the referring device 112) of the decision (e.g., awarding or denial) regarding the referral. In some instances, the notification may indicate a reason for the decision. In some such instances, the reason may only be provided if the referral is denied. In some embodiments, the referral server 102 may also notify the referred party 108 (e.g., via the referred device 114) of the decision of the referral. In some instances, a notification may only be sent in cases of denial or only in cases of awarding of the referral.

The methods and systems discussed herein provide for improved fraud prevention of account referrals through the use of a blockchain network 110. The referral server 102 and processing server 104 work together to determine when a referred party 108 is genuine by evaluating the transactional history of a blockchain wallet associated with the referred party 108. The validation of a digital signature ensures that the referred party 108 cannot pretend to be someone else, while the evaluation of the transactional history of the blockchain wallet ensures that the referred party 108 is not fake, or otherwise requires a significant undertaking by the referring party 106 to pretend to be the referred party 108. Thus, fake and disingenuous attempts at referrals can be prevented, increasing the number of genuine referred parties 108 for the referral server 102.

Referral Server and Processing Server

Figure 2:
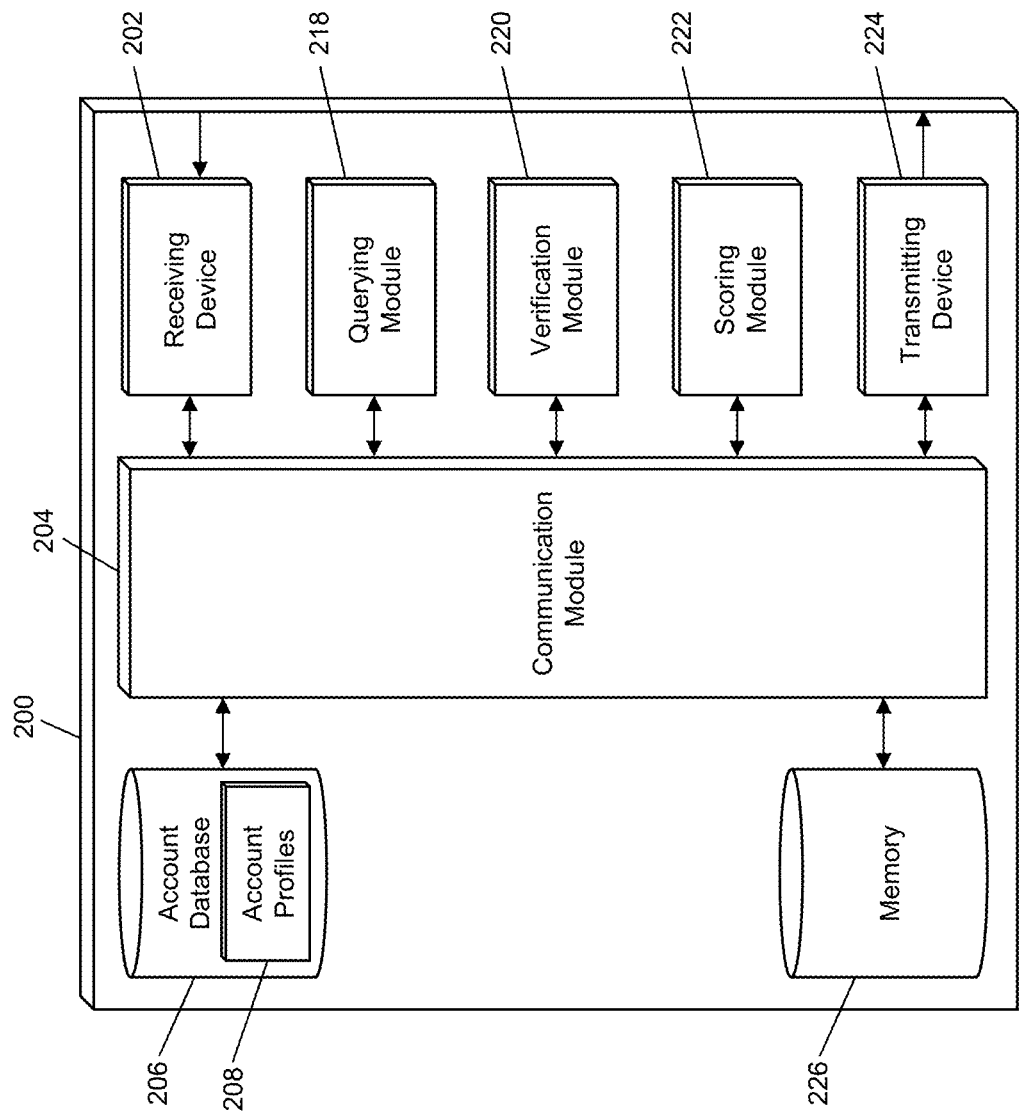
FIG. 2 is a block diagram illustrating a computing system that can serve as the processing server or referral server of the system of FIG. 1 for preventing account referral fraud in accordance with exemplary embodiments.

FIG. 2 illustrates an embodiment of a computing system 200, such as may serve as the referral server 102 and/or the processing server 104 in the system 100. In some embodiments, a single computing system 200 may operate as both the referral server 102 and the processing server 104 in the system 100. It will be apparent to persons having skill in the relevant art that the embodiment of the computing system 200 illustrated in FIG. 2 is provided as illustration only and may not be exhaustive to all possible configurations of the computing system 200 suitable for performing the functions as discussed herein. For example, the computer system 500 illustrated in FIG. 5 and discussed in more detail below may be a suitable configuration of the computing system 200.

The computing system 200 may include a receiving device 202. The receiving device 202 may be configured to receive data over one or more networks via one or more network protocols. In some instances, the receiving device 202 may be configured to receive data from referral servers 102, processing servers 104, blockchain networks 110, referring devices 112, referred devices 114, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by referral servers 102 that are superimposed or otherwise encoded with request for authenticity scores, which may include a digital signature and/or contact information, and may in some cases also include a public key, score criteria, and/or other data. The receiving device 202 may also be configured to receive data signals electronically transmitted by processing servers 104, which may be superimposed or otherwise encoded with determined authenticity scores. The receiving device 202 may be configured to receive data signals electronically transmitted by blockchain networks 110, which may be superimposed or otherwise encoded with public keys, blockchain data values, or blocks. The receiving device 202 may be further configured to receive data signals electronically transmitted by referring devices 112 or referred devices 114 that may be superimposed or otherwise encoded with digital signatures, public keys, and/or contact addresses for other devices for referrals.

The computing system 200 may also include a communication module 204. The communication module 204 may be configured to transmit data between modules, engines, databases, memories, and other components of the computing system 200 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing system 200 and external components of the computing system 200, such as externally connected databases, display devices, input devices, etc. The computing system 200 may also include a processing device. The processing device may be configured to perform the functions of the computing system 200 discussed herein as will be apparent to persons having skill in the relevant art. In some embodiments, the processing device may include and/or be comprised of a plurality of engines and/or modules specially configured to perform one or more functions of the processing device, such as a querying module 218, verification module 220, scoring module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include an account database 206. The account database 206 may be configured to store a plurality of account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data related to a user, such as the referring party 106 or referred party 108. Each account profile 208 may include at least an account identifier that is uniquely associated with the account profile 208 and/or related user, which may be included in transmissions made to/from the computing system 200 for use in identifying the related user account. In some embodiments, referral rewards that are issued may be applied to the referring party 106 via their account profile 208.

The computing system 200 may include a querying module 218. The querying module 218 may be configured to execute queries on databases to identify information. The querying module 218 may receive one or more data values or query strings, and may execute a query string based thereon on an indicated database, such as the account database 206, to identify information stored therein. The querying module 218 may then output the identified information to an appropriate engine or module of the computing system 200 as necessary. The querying module 218 may, for example, execute a query on the account database 206 to identify an account profile that includes an account identifier included in a referral for use in applying a referral award to that account profile 208 if the referral is awarded based on the generated authenticity score.

The computing system 200 may also include a verification module 220. The verification module 220 may be configured to perform data verification and validation for the computing system 200 as discussed herein. The verification module 220 may receive instructions for data to be verified as input, may attempt to verify the data, and may output a result of the attempt to another module or engine of the computing system 200. In some cases, the data to be verified may be included in the instructions. In other cases, the verification module 220 may first identify the data to be verified as indicated in the instructions. The verification module 220 may, for example, be configured to verify digital signatures using public keys in accordance with applicable signature generation algorithms.

The computing system 200 may also include a scoring module 222. The scoring module 222 may be configured to generate authenticity scores for the computing system 200 as discussed herein. The scoring module 222 may receive instructions as input, may generate an authenticity score in accordance with the instructions, and may output the generated authenticity score to another module or engine of the computing system 200. In some cases, the data to be used in generating the authenticity score (e.g., the blockchain data values) may be included in the instructions. In other cases, the scoring module 222 may be configured to identify (e.g., using the querying module 218) the blockchain data values. The scoring module 222 may generate an authenticity score for a blockchain wallet based on the data included in blockchain data values that are attributable to that blockchain wallet, as discussed in more detail above.

The computing system 200 may also include a transmitting device 224. The transmitting device 224 may be configured to transmit data over one or more networks via one or more network protocols. In some instances, the transmitting device 224 may be configured to transmit data to referral servers 102, processing servers 104, blockchain networks 110, referring devices 112, referred devices 114, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to processing servers 104 that are superimposed or otherwise encoded with request for authenticity scores, which may include a digital signature and/or contact information, and may in some cases also include a public key, score criteria, and/or other data. The transmitting device 224 may also be configured to electronically transmit data signals to referral servers 102, which may be superimposed or otherwise encoded with determined authenticity scores. The transmitting device 224 may be further configured to electronically transmit data signals to blockchain networks 110 that are superimposed or otherwise encoded with requests for blockchain data values, blocks, and/or public keys. The transmitting device 224 may also be configured to electronically transmit data signals to referring devices 112 and referred devices 114 that may be superimposed or otherwise encoded with requests for digital signatures and/or public keys, as well as notifications regarding referral decisions.

The computing system 200 may also include a memory 226. The memory 226 may be configured to store data for use by the computing system 200 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the computing system 200 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, blockchain data including blockchain data values and public keys, signature generation algorithms, authenticity scoring algorithms, authenticity threshold values, etc.

Process for Determining Referral Authenticity

Figure 3:
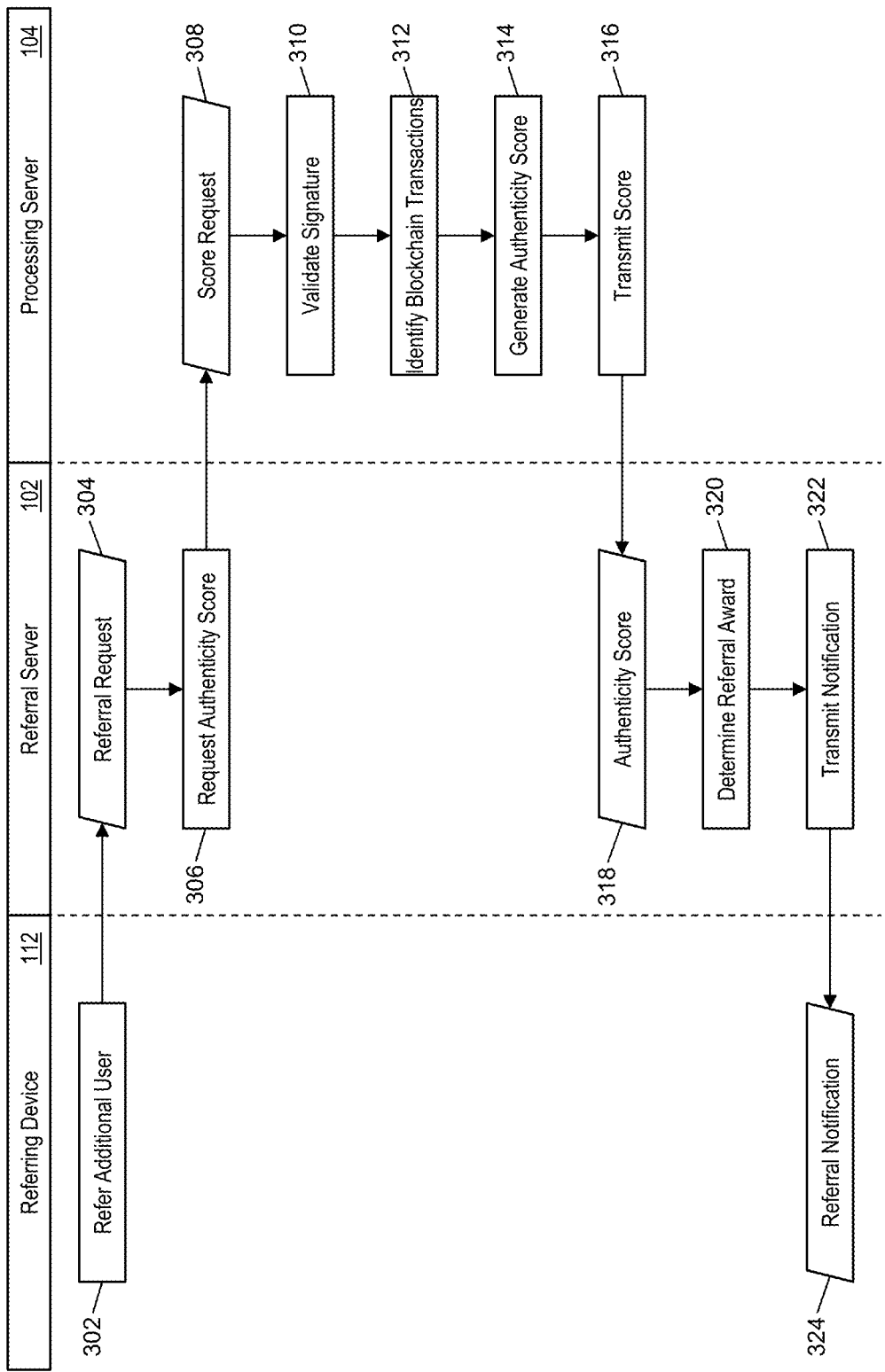
FIG. 3 is a flow diagram illustrating a process for the preventing account referral fraud using blockchain in the system of FIG. 1 in accordance with exemplary embodiments.

FIG. 3 illustrates an example process for the determination of authenticity of a referral and awarding thereof in the system 100 illustrated in FIG. 1.

In step 302, the referring party 106 in the system 100 may, using the referring device 112, submit a referral referring the referred party 108 to the referral server 102 using a suitable communication network and method. In step 304, the receiving device 202 of the referral server 102 may receive the referral request. The referral request may include at least a digital signature generated by the referred device 114 using a private key of a cryptographic key pair thereof. In step 306, the transmitting device 224 of the referral server 102 may electronically transmit a request for an authenticity score to the processing server 104 using a suitable communication network and method. The request may include at least the digital signature and may, in some cases, also include a public key of the cryptographic key pair of the referred device 114.

In step 308, the receiving device 202 of the processing server 104 may receive the score request from the referral server 102. In step 310, the verification module 220 of the processing server 102 may validate the digital signature included in the request using the public key of the cryptographic key pair, which may have been included in the request, previously stored by the processing server 104 (e.g., in the memory 226 or an account profile 208), or obtained from the blockchain network 110. Once the digital signature is validated, then, in step 312, a plurality of blockchain transactions involving the referred device 114 may be identified (e.g., via the execution of a query on the memory 226 by the querying module 218 of the processing server 104 to identify the blockchain data values in stored blockchain data, or by requesting the blockchain data values from the blockchain network 110 through the transmitting device 224 of the processing server 104).

In step 314, the scoring module 222 of the processing server 102 may generate an authenticity score for the referred device 114. The authenticity score may be based on the data included in each of the identified blockchain data values. The authenticity score may be based on at least, for instance, the number of blockchain transactions, frequency of blockchain transactions, time elapsed between first and most recent blockchain transactions, overall amount transferred in blockchain transactions, number of wallets interacted with in blockchain transactions, etc. In step 316, the transmitting device 224 of the processing server 104 may electronically transmit the determined authenticity score to the referral server 102 using a suitable communication network and method. In step 318, the receiving device 202 of the referral server 102 may receive the authenticity score.

In step 320, the referral server 102 may determine if a referral award is to be awarded to the referring party 106. The determination may be based on a comparison of the determined authenticity score to a predetermined threshold value. In some cases, the threshold value may be based on the past referral history of the referring party 106. For instance, a referring party 106 who has previously made fraudulent referrals may require a higher authenticity score than a trusted user. Similarly, the authenticity score may increase for each successful referral to prevent abuse of the referral system. In step 322, the transmitting device 224 of the referral server 102 may electronically transmit a notification to the referring device 112 using a suitable communication network and method that indicates if the referral award is being awarded or not. In some cases, the notification may include a reason for the decision. In step 324, the referring device 112 may receive the notification, which may be presented to the referring party 106. In some embodiments, a notification may also be electronically transmitted to the referred device 114.

Exemplary Method for Preventing Account Referral Fraud

Figure 4:
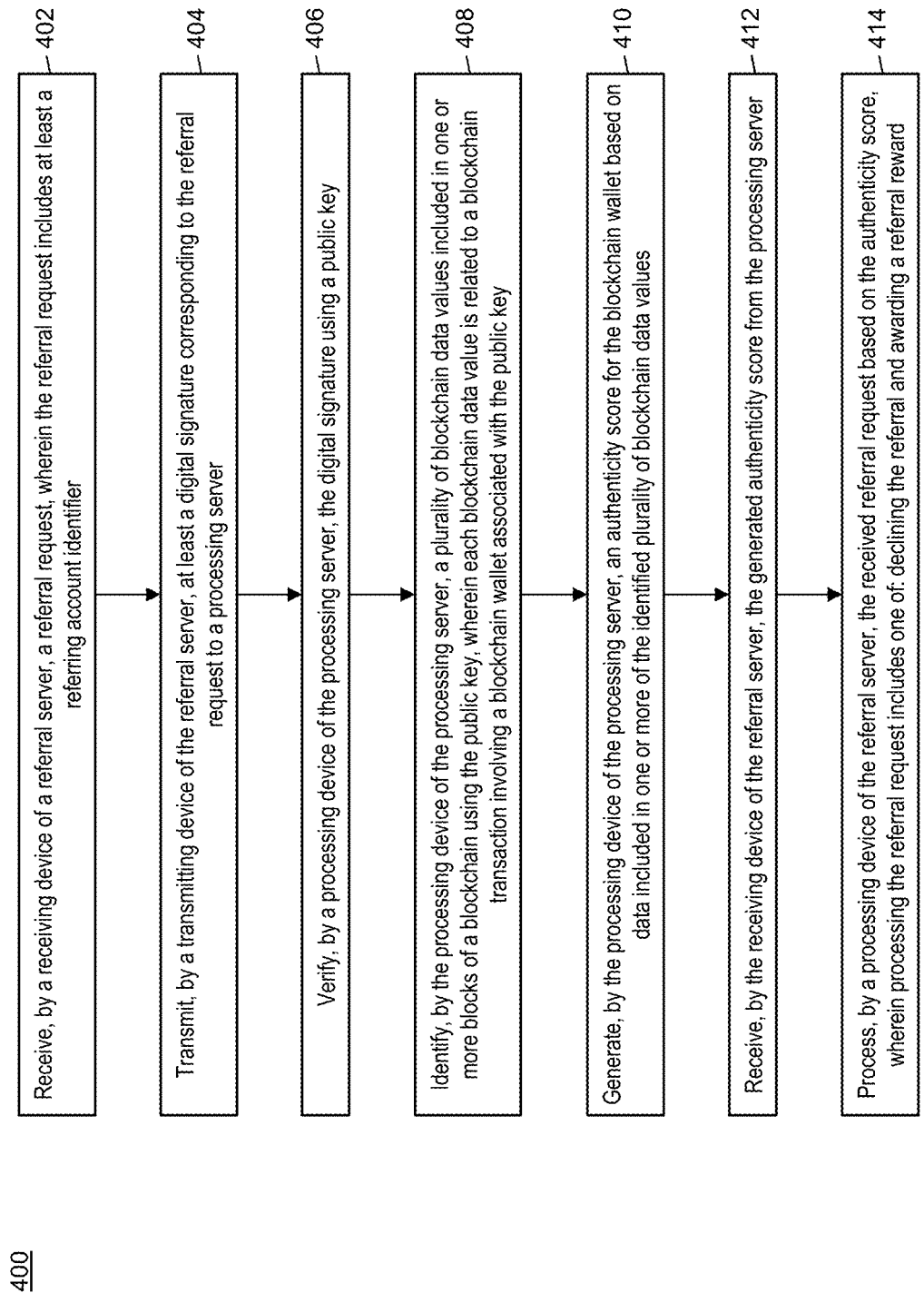
FIG. 4 is a flow chart illustrating an exemplary method for preventing account referral fraud in accordance with exemplary embodiments.

FIG. 4 illustrates a method 400 for the prevention of referral fraud via the use of a blockchain and corresponding transactional history.

In step 402, a referral request may be received by a receiving device (e.g., the receiving device 202) of a referral server (e.g., the referral server 102), wherein the referral request includes at least a referring account identifier. In step 404, at least a digital signature corresponding to the referral request may be transmitted by a transmitting device (e.g., the transmitting device 224) of the referral server to a processing server (e.g., the processing server 104). In step 406, the digital signature may be verified by a processing device of the processing server using a public key. In step 408, a plurality of blockchain data values included in one or more blocks of a blockchain may be identified by the processing device of the processing server using the public key, wherein each blockchain data value is related to a blockchain transaction involving a blockchain wallet associated with the public key.

In step 410, an authenticity score may be generated by the processing device of the processing server for the blockchain wallet based on data included in one or more of the identified plurality of blockchain data values. In step 412, the generated authenticity score may be received by the receiving device of the referral server from the processing server. In step 414, the received referral request may be processed by a processing device of the referral server based on the authenticity score, wherein processing the referral request includes one of: declining the referral and awarding a referral reward.

In one embodiment, awarding a referral reward may include applying, by the processing device of the referral server, the referral reward to an account profile (e.g., account profile 208) associated with a referring account stored in an account database (e.g., account database 206) of the referral server. In a further embodiment, the referral request may further include a referring account identifier, and the referring account may include the referring account identifier. In some embodiments, the referral reward may be awarded if the authenticity score exceeds a predetermined threshold value.

In one embodiment, the method 400 may further include receiving, by the receiving device of the referral server, the digital signature in a separate message from the referral request. In a further embodiment, the separate message may further include the public key, and the public key may be transmitted to the processing server with the digital signature. In some embodiments, the referral request may include the digital signature. In one embodiment, the authenticity score may be based on at least one of: a number of blockchain data values in the plurality of blockchain data values, a frequency of blockchain transactions in the plurality of blockchain data values, and a time period between an earliest blockchain data value and a latest blockchain data value.

Computer System Architecture

Figure 5:
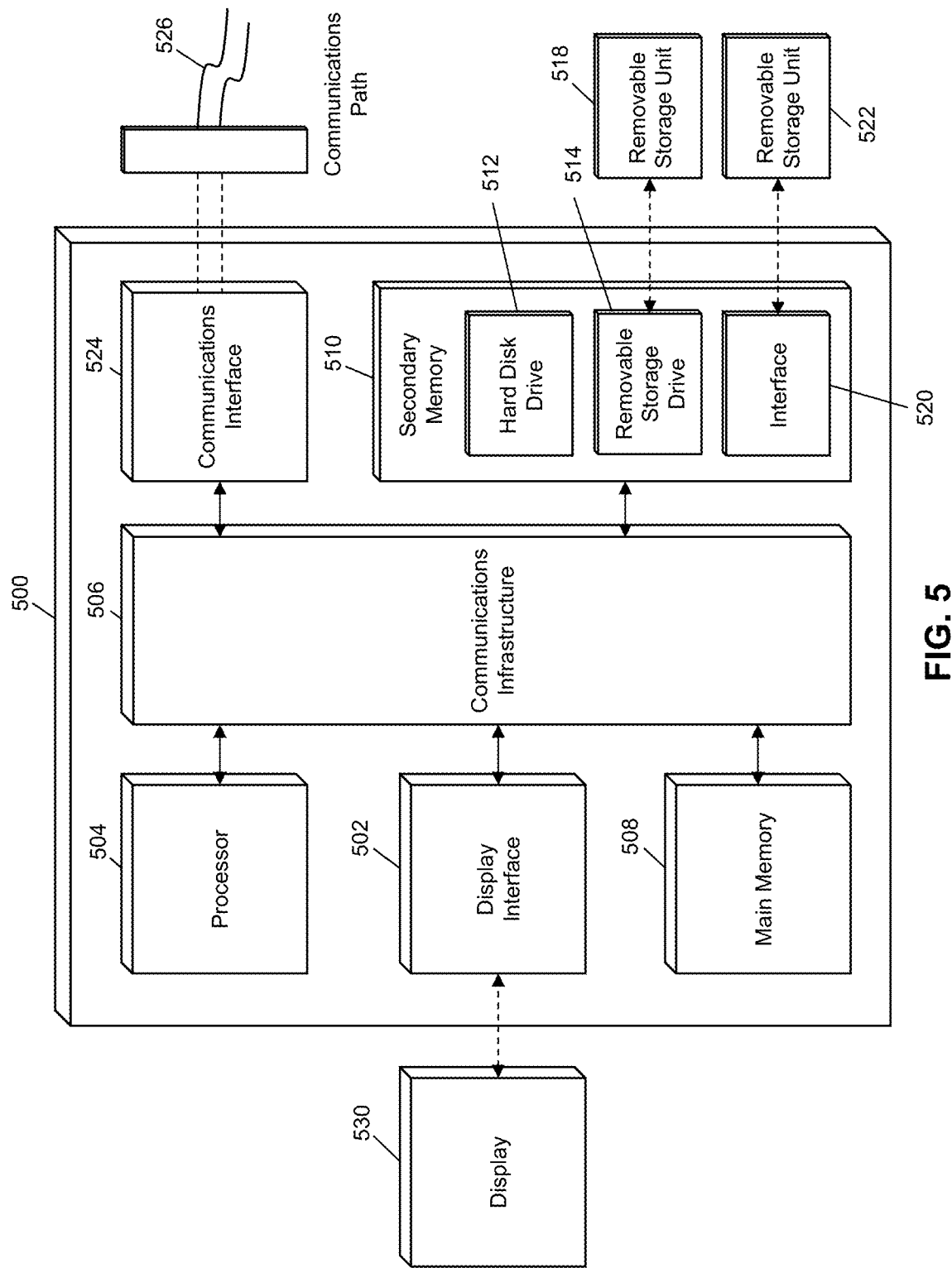
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the referral server 102 and processing server 104 of FIG. 1 and computing system 200 of FIG. 2 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for preventing account referral fraud. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for preventing account referral fraud, comprising:
   receiving, by a receiving device of a processing server, at least a digital signature from a referral server, wherein the digital signature corresponds to a referred request that includes a referring account identifier received at the referral server;
   verifying, by a processing device of the processing server, the digital signature using a public key;
   identifying, by the processing device of the processing server, a plurality of blockchain data values included in one or more blocks of a blockchain using the public key, wherein each blockchain data value is related to a blockchain transaction involving a blockchain wallet associated with the public key;
   generating, by the processing device of the processing server, an authenticity score for the blockchain wallet based on data included in one or more of the identified plurality of blockchain data values, including at least the number of different wallets involved in transactions involving the referring account identifier; and
   transmitting, by a transmitting device of the processing server, the generated authenticity score to the referral server for processing based on the authenticity score, wherein processing the referral request includes one of: declining the referral and awarding a referral reward.

2. The method of claim 1, wherein awarding a referral reward includes applying, by the processing device of the referral server, the referral reward to an account profile associated with a referring account stored in an account database of the referral server.

3. The method of claim 2, wherein
   the referral request further includes a referring account identifier, and
   the referring account includes the referring account identifier.

4. The method of claim 1, wherein the referral reward is awarded if the authenticity score exceeds a predetermined threshold value.

5. The method of claim 1, further comprising:
   receiving, by the receiving device of the referral server, the digital signature in a separate message from the referral request.

6. The method of claim 5, wherein
   the separate message further includes the public key, and
   the public key is transmitted to the processing server with the digital signature.

7. The method of claim 1, wherein the referral request includes the digital signature.

8. The method of claim 1, wherein the authenticity score is based on at least one of: a number of blockchain data values in the plurality of blockchain data values, a frequency of blockchain transactions in the plurality of blockchain data values, and a time period between an earliest blockchain data value and a latest blockchain data value.

9. A system for preventing account referral fraud, comprising:
   a receiving device of a processing server configured to receive at least a digital signature from a referral server, wherein the digital signature corresponds to a referred request that includes a referring account identifier received at the referral server;
   a processing device of the processing server configured to
      verify the digital signature using a public key,
      identify a plurality of blockchain data values included in one or more blocks of a blockchain using the public key, wherein each blockchain data value is related to a blockchain transaction involving a blockchain wallet associated with the public key, and
      generate an authenticity score for the blockchain wallet based on data included in one or more of the identified plurality of blockchain data values, including the number of different wallets involved in transactions involving the referring account identifier, and
   a transmitting device of the processing server configured to transmit the generated authenticity score to the referral server for processing based on the authenticity score, wherein processing the referral request includes one of: declining the referral and awarding a referral reward.

10. The system of claim 9, wherein awarding a referral reward includes applying, by the processing device of the referral server, the referral reward to an account profile associated with a referring account stored in an account database of the referral server.

11. The system of claim 10, wherein
    the referral request further includes a referring account identifier, and
    the referring account includes the referring account identifier.

12. The system of claim 9, wherein the referral reward is awarded if the authenticity score exceeds a predetermined threshold value.

13. The system of claim 9, wherein the receiving device of the referral server is further configured to receive the digital signature in a separate message from the referral request.

14. The system of claim 13, wherein
    the separate message further includes the public key, and
    the public key is transmitted to the processing server with the digital signature.

15. The system of claim 9, wherein the referral request includes the digital signature.

16. The system of claim 9, wherein the authenticity score is based on at least one of: a number of blockchain data values in the plurality of blockchain data values, a frequency of blockchain transactions in the plurality of blockchain data values, and a time period between an earliest blockchain data value and a latest blockchain data value.

\* \* \* \* \*